United States Patent
Dodrill et al.

(10) Patent No.: US 7,069,309 B1
(45) Date of Patent: Jun. 27, 2006

(54) APPARATUS AND METHODS FOR REQUESTING AN EVENT NOTIFICATION OVER A NETWORK

(75) Inventors: Lewis D. Dodrill, Richmond, VA (US); Ryan A. Danner, Glen Allen, VA (US); Steven J. Martin, Richmond, VA (US)

(73) Assignee: Cisco Technology, Inc., San Jose, CA (US)

( * ) Notice: Subject to any disclaimer, the term of this patent is extended or adjusted under 35 U.S.C. 154(b) by 874 days.

(21) Appl. No.: 09/691,895

(22) Filed: Oct. 19, 2000

(51) Int. Cl.
*G06F 15/16* (2006.01)

(52) U.S. Cl. ..................... 709/219; 719/318

(58) Field of Classification Search ............... 709/202, 709/223–224, 217, 318; 707/10; 379/88.12; 719/328, 318; 715/700
See application file for complete search history.

(56) References Cited

U.S. PATENT DOCUMENTS

| | | | |
|---|---|---|---|
| 4,837,798 A | 6/1989 | Cohen et al. ................. 379/88 |
| 5,946,464 A * | 8/1999 | Kito et al. ................... 709/202 |
| 5,961,651 A * | 10/1999 | Gittins et al. ................. 714/5 |
| 6,092,102 A * | 7/2000 | Wagner ...................... 340/7.29 |
| 6,167,448 A * | 12/2000 | Hemphill et al. ........... 709/224 |
| 6,233,449 B1 * | 5/2001 | Glitho et al. ............... 455/423 |
| 6,253,061 B1 | 6/2001 | Helferich ................... 455/31.2 |
| 6,259,892 B1 | 7/2001 | Helferich ................... 455/31.3 |
| 6,389,276 B1 * | 5/2002 | Brilla et al. ................. 455/413 |
| 6,400,810 B1 * | 6/2002 | Skladman et al. ........ 379/93.24 |
| 6,480,720 B1 * | 11/2002 | Coan et al. ................. 455/458 |
| 6,496,568 B1 * | 12/2002 | Nelson ..................... 379/88.12 |
| 6,574,630 B1 * | 6/2003 | Augustine et al. ............ 707/10 |
| 6,594,682 B1 * | 7/2003 | Peterson et al. ............ 718/102 |
| 6,609,148 B1 * | 8/2003 | Salo et al. .................. 709/217 |
| 6,671,355 B1 * | 12/2003 | Spielman et al. ........ 379/88.12 |
| 6,681,245 B1 * | 1/2004 | Sasagawa ................... 709/206 |
| 6,686,838 B1 * | 2/2004 | Rezvani et al. ............. 340/506 |
| 6,813,507 B1 * | 11/2004 | Gress et al. ................ 455/466 |

* cited by examiner

*Primary Examiner*—Abdullahi Salad
(74) *Attorney, Agent, or Firm*—Chapin IP Law, LLC; Barry W. Chapin, Esq.

(57) ABSTRACT

The invention is directed to techniques for providing an event notification string over a network to a notification server. An application server includes a notifying application that monitors, or otherwise determines, the occurrence of an event of interest to a target user who uses a device that can receive notification of the event. The notifying application generates an event notification string that indicates that a notification to the target user should be made. The notifying application then sends the event notification string over a network, such as an IP (Internet Protocol) network, to a notification server, which provides an event notification application that processes the event notification string The event notification application determines the identity of the target user, if the event notification string does not provide this information itself, and which devices accessed by the target user should receive the notification. The event notification application then sends event notifications to one or more of the devices.

16 Claims, 7 Drawing Sheets

```
<?xml version="1.0" standalone="yes"?>

<EVENT_STATUS id="1122334455xyz" event="MSGWAITING:ON">         — 502

<EVENT_STATE last_change_time="14:45:34.21" last_change_date="02/14/2000" state="Completed"/>   — 504

<NODE_LIST>

<DEVICE type="pager" id="8045550000" status="OK"/>    — 506A

<DEVICE type="mwi"   id="8045551212" status="RNA"/>   — 506B

</NODE_LIST>

</EVENT_STATUS>
```

702 AN APPLICATION USER USES A DEVICE (E.G. TELEPHONE) TO ACCESS A NOTIFYING APPLICATION (E.G., VOICE MAIL APPLICATION) EXECUTING ON AN APPLICATION SERVER AND LEAVES A MESSAGE FOR ANOTHER INDIVIDUAL (E.G., TARGET USER)

↓

704 THE APPLICATION SERVER SENDS AN EVENT NOTIFICATION STRING IN AN HTTP REQUEST TO A NOTIFICATION SERVER (E.G., NOTIFIER) TO REQUEST NOTIFICATION OF THE VOICE MESSAGE TO USER 2, BASED ON A URL, FOR EXAMPLE:    http://notifier/app.cgi?MSGWAITING:ON:sesid12123434abcd:

↓

706 THE NOTIFICATION SERVER RETURNS AN EVENT STATUS ID, AND THE APPLICATION SERVER CLOSES THE CONNECTION WITH THE NOTIFICATION SERVER.

↓

708 THE NOTIFICATION SERVER READS THE STATE INFORMATION FOR THE SESSION FROM THE APPLICATION-STATE DATA RECORD (E.G., IDENTIFIED BY SESSION IDENTIFIER "sesid12123434abcd:" FOR THE CURRENT SESSION OF THE VOICE MAIL APPLICATION), AND FINDS THE IDENTITY OF THE TARGET USER.

↓

710 THE NOTIFICATION SERVER LOOKS UP THE TARGET USER'S PREFERENCES FOR NOTIFICATION IN A DATABASE (E.G., AN LDAP DIRECTORY) AND FINDS ONE OR MORE DEVICES FOR NOTIFYING THE TARGET USER (E.G., TWO TELEPHONES WITH MWI CAPABILITY AND ONE PAGER).

↓

712 THE NOTIFICATION SERVER SENDS THE NOTIFICATION TO THE DEVICES IDENTIFIED FOR THE TARGET USER (E.G., USES TELEPHONY API'S TO ACCESS THE MWI DEVICES, AND SENDS AN SMTP MAIL MESSAGE TO THE PAGING SERVICE FOR THE PAGER).

FIG. 7

APPARATUS AND METHODS FOR REQUESTING AN EVENT NOTIFICATION OVER A NETWORK

BACKGROUND OF THE INVENTION

Historically, a user of one computer system has been able to send a message, such as an electronic mail message, from the computer system to another user who is using another computer system. The sender of the message can use the message to alert the user of the other computer system of the occurrence of some event that the sender wishes to pass on to the receiver of the message.

Computers can also present event notifications to a user of the computer system. For example, if the user receives electronic mail, then the user receives a message box on the display screen of the computer that informs the user that an electronic mail message has been received by the user at the computer.

Paging systems have long been available to inform a user of an event, such as a phone call. For example, if a user of a pager receives a phone call from another person, then the user receives a notification on the user's pager of the phone call, such as a beep or a vibration generated by the pager. The notification may include specific information such as the phone number to use to call back the other person displayed on the visual display of the pager.

Telephony systems have message waiting indicators (MWI) available on some telephony devices that provide notification of an event, such as a voice mail message. For example, a telephone may have a small light that lights up or blinks when a voice mail message was left with the voice mail service for that telephone.

Conventional computer systems are also capable of sending electronic mail messages to a user's computer to inform the computer of the occurrence of an event of interest to the user. For example, a user may subscribe to a computerized stock brokerage service and request that he or she be informed if the price of a specific stock falls (or rises) to a certain level. The service can then send the user an electronic mail message informing the user of the change in the stock price.

SUMMARY OF THE INVENTION

In conventional systems, software applications may provide notification of the occurrence of an event to different devices, such as providing a notification message to a pager, a telephone having an MWI, a telephone that can produce a "stutter" dial tone, a facsimile machine, or other devices. In conventional approaches, devices have different interfaces for event notification. For example, a user, who is the target of an event notification, receives a voice message at a computerized voice messaging service that the target user subscribes to; if the target user wishes to be notified by pager as well as by a telephone with an MWI in his/her office of the voice message, then the computerized service receiving the message must generate two different event notification messages, one for the pager and one for the telephone in the target user's office. The service must also use the interfaces that are available for such an event notification message, which typically requires some overhead to construct and transmit the message, such as an electronic mail message, over a network.

In contrast, using the techniques of the present invention, a computer application sending an event notification string based on an event notification URL (Uniform Resource Locator) can send the string in a relatively low overhead network format. For example, the application can include the event notification string as part of an HTTP (hypertext transport protocol) request that minimizes the time and effort to prepare the request as well as to send it over a network, such as the Internet, compared to generating and sending a message through electronic mail. In addition, the notifying or requesting application (e.g. one that requests that an event notification be made) can prepare an event notification string relying on a single format, such as a URL-based format, and send the string to an event notification application. This application handles the details of determining where to send the event notification and what interface to use (e.g. electronic mail or public telephone network) without unduly burdening the notifying application itself. The requesting application, such as a voice messaging service, can thus provide services at a more optimal level, because the application does not have to expend resources determining all the details of every event notification. For example, after receiving the event notification string, the event notification application can query a database of subscribers, such as a LDAP (Lightweight Directory Access Protocol) database, to obtain information on a user's preferences for notification of an event, such as what devices (e.g. pagers, telephones, etc.) a user wishes to receive the notification.

In one embodiment, the invention is directed to a method in a notification server for providing a notification of an occurrence of an event. The method includes receiving an event notification string including event information that identifies one or more features of the event and identification information that identifies an executable resource capable of processing the event information, determining notification information that identifies a device to be notified of the occurrence of the event in response to receiving the event notification string, and providing an event notification to the device in response to determining the notification information. Thus, a server or other computing device can provide a string of event notification information without all the detailed information necessary to accomplish the event notification and is not burdened by the details of performing and monitoring the event notification itself.

In another embodiment, the method includes an HTTP request that includes the event information and the identification information. Thus, a server or other computing device providing the event information and identification information can use a relatively low overhead approach (i.e., the HTTP request) to request the event notification.

The method includes, in a further embodiment, receiving one or more of an event type, an event value, an application session identifier, and a parameter. The event notification string includes the appropriate information identifying the event information, as well as additional information, such as parameter information and the application session identifier that identifies the notifying application. Thus, the notification server can use this additional information to obtain additional details related to the occurrence of the event, such as the identity of the target user who is to receive the notification.

In an additional embodiment, the method includes accessing a database that provides the notification preferences of a user. Thus, the user can indicate one or more devices (e.g. a pager) that he/she wishes to use to receive a notification. The notification preferences are stored in a database that the notification server can use to determine the user's preferences. Another embodiment of the method includes accessing an application-state registry. For example, a server handling the notification can obtain the identity of the target user to receive a notification from information stored in the application-state registry that records information about an application session of the notifying application that has requested the notification. In an additional embodiment, the method includes accessing subscriber profile information from a lightweight directory access protocol (LDAP) directory. For example, a server handling the notification can obtain information about the target user's preferences from the LDAP directory. Another embodiment of the method includes notifying the device according to the notification preferences. For example, a server handling the notification determines what preferences the user has for notification from the database (e.g., during working hours to send an electronic mail message to the user's computer, or during the evening to send a notification to a pager). The server then uses those preferences to notify the user. In another embodiment, the method includes notifying one or more preferred devices identified by the notification preferences. For example, the user can indicate that he/she wishes to be notified by activating an MWI indicator on his/her telephone and also by activating his/her pager.

The method includes, in a further embodiment, receiving an application session identifier that identifies the current session of the application, such as the notifying application, and accessing an application-state data record based on the application session identifier. For example, the notification server can use the application session identifier to access an application-state data record that provides information on the session and identifies the target user who is to receive the notification.

In another embodiment, the method includes providing the event notification based on an application programming interface (API) to a service that provides communication to an external resource. For example, the notification server can use an electronic mail API to send an electronic mail message to a paging service instructing the service to page the target user's pager.

In further embodiment, the method includes providing an event identifier in response to receiving the event notification string and determining the notification information, receiving a query request based on the event identifier that requests a status of the event notification, and providing a response to the query request that indicates the status of the event notification. Thus, a server or computer device, which provided the event notification string to indicate that an event notification should be done, can make a request to determine whether the notification has actually occurred.

In one embodiment, the invention is directed to a notification server configured for providing a notification of an occurrence of an event. The notification server includes a network interface and an executable resource. The network interface is configured to receive an event notification string including event information that identifies one or more features of the event and identification information that identifies an executable resource capable of processing the event information. The executable resource is configured to determine notification information that identifies a device to be notified of the occurrence of the event based on the event notification string. The executable resource is configured to provide through the network interface an event notification to the device based on the notification information. Thus, a server or other computing device can provide a string of event notification information to the notification server without all the detailed information necessary to accomplish the event notification and is not burdened by the details of performing and monitoring the event notification itself.

In another embodiment, the event notification string is a HTTP request including the event information and the identification information. Thus, a server or other computing device providing the event information and identification information can use a relatively low overhead approach (i.e., the HTTP request) to request the event notification.

The event notification string, in another embodiment, includes one or more of an event type, an event value, an application session identifier, and a parameter. The event notification string includes the appropriate information identifying the event information, as well as additional information, such as parameter information and the application session identifier that identifies the notifying application. Thus, the notification server can use this additional information to obtain additional details related to the occurrence of the event, such as the identity of the target user, who is to receive the notification.

In a further embodiment, the executable resource accesses a database including notification preferences of a user. Thus, the user can indicate one or more devices (e.g. a pager) that he/she wishes to use to receive a notification. The notification preferences are stored in a database that the notification server can use to determine the target user's preferences. In another embodiment, the database is an application-state registry. For example, a server handling the notification can obtain the identity of the target user from information stored in the application-state registry that records information about an application session of the notifying application that has requested the notification. In a further embodiment, the database is a lightweight directory access protocol (LDAP) directory, and the executable resource accesses user profile information from the LDAP directory. For example, a server handling the notification can obtain information about the target user's notification preferences from the LDAP directory. In another embodiment, the network interface notifies the device according to the notification preferences. For example, a server handling the notification determines what preferences the user has for notification from the database (e.g., during working hours to send an electronic mail message to the user's computer, or during the evening to send a notification to a pager). The server then uses those preferences to notify the user. In an additional embodiment, the network interface notifies one or more preferred devices identified by the notification preferences. For example, the user can indicate that he/she wishes to be notified by activating an MWI indicator on his/her telephone and also by activating his/her pager.

In a further embodiment, the event notification string includes an application session identifier that identifies the current session of the application, such as the notifying application, and the executable resource accesses an application-state data record based on the application session identifier. For example, the notification server can use the application session identifier that identifies the current session of the notifying application to access an application-state data record that provides information on the session.

In another embodiment, the executable resource provides the event notification based on an API to a service that provides communication to an external resource. For example, the notification server can use an electronic mail API to send an electronic mail message to a paging service to page the target user's pager.

In a further embodiment, the network interface provides an event identifier generated by the executable resource based on the event notification string and the notification information; the network interface receives a query request based on the event identifier that requests a status of the event notification; and the executable resource provides through the network interface a response to the query request that indicates the status of the event notification. Thus, a server or computer device which provided the event notification string to indicate that an event notification should be done can make a request to determine whether the notification has actually occurred.

In one embodiment, the invention is directed to a notification server configured for providing a notification of an occurrence of an event. The notification server includes a network interface and means for producing an event notification. The network interface is configured to receive an event notification string including event information that identifies one or more features of the event and identification information that identifies an executable resource capable of processing the event information. The producing means is configured to determine notification information that identifies a device to be notified of the occurrence of the event based on the event notification string. The producing means is configured to provide through the network interface an event notification to the device based on the notification information.

In another embodiment, the invention is directed to a computer program product that includes a computer readable medium having instructions for providing a notification of an occurrence of an event, such that the instructions, when carried out by a computer, cause the computer to perform any or all of the operations disclosed herein of the invention. For example, the instructions cause the computer to receive an event notification string including event information that identifies one or more features of the event and identification information that identifies an executable resource capable of processing the event information. The instructions also cause the computer to determine notification information that identifies a device to be notified of the occurrence of the event in response to receiving the event notification string and to provide an event notification to the device in response to determining the notification information.

In one embodiment, the invention is directed to a method in a computer system for requesting a notification of an occurrence of an event. The method includes detecting the occurrence of the event, generating an event notification string in response to detecting the occurrence of the event, and providing the event notification string to the notification server in response to generating the event notification string. The event notification string including event information that identifies one or more features of the event and identification information that identifies an executable resource capable of processing the event information on a notification server. Thus, a server or other computing system can provide a string of event notification information without all the detailed information necessary to accomplish the event notification and is not burdened by the details of performing and monitoring the event notification itself.

In another embodiment, the method includes generating an HTTP request including the event information and the identification information. Thus, a server or other computing system providing the event information and identification information can use a relatively low overhead approach (i.e., the HTTP request) to request the event notification.

Another embodiment of the method includes referencing a URL that includes the event information, the identification information, and an address of the notification server. The method also includes generating an HTTP request based on the URL. For example, a server or computing system can use the URL to generate the HTTP request including an event notification string using a URL-based format.

A further embodiment of the method includes generating one or more of an event type, an event value, an application session identifier, and a parameter. The event notification string includes the appropriate information identifying the event information, as well as additional information, such as parameter information and the application session identifier that identifies the notifying application. Thus, the additional information can be used to obtain additional details related to the occurrence of the event, such as the identity of the target user who is to receive the notification.

In another embodiment, the method includes generating an application session identifier that corresponds to an application-state data record. The application session identifier identifies the current session of a notifying application executing on the computing system and an application-state data record that records information about the current session, including, for example, the identity of the target user.

In a further embodiment, the method includes receiving an event identifier in response to providing the event notification string, providing a query request based on the event identifier that requests a status of the notification, and receiving a response indicating the status of the notification. Thus, the computer system can receive an event identifier and make a request to determine whether the notification has actually occurred.

In one embodiment, the invention is directed to a computer system configured for requesting a notification of an occurrence of an event. The computer system includes a network interface and a first executable resource. The first executable resource is configured to detect the occurrence of the event and to generate an event notification string in response to detecting the occurrence of the event. The event notification string includes event information that identifies one or more features of the event and identification information that identifies a second executable resource capable of processing the event information on a notification server. The network interface is configured to provide the event notification string to the notification server. Thus, the computer system can provide a string of event notification information without all the detailed information necessary to accomplish the event notification and is not burdened by the details of performing and monitoring the event notification itself.

In another embodiment, the event notification string is an HTTP request including the event information and the identification information. Thus, the computer system providing the event information and identification information can use a relatively low overhead approach (i.e., the HTTP request) to request the event notification.

In an additional embodiment, the computer system includes a URL that includes the event information, the identification information, and an address of the notification server, and the first executable resource generates an HTTP request based on the URL. For example, the computer system can use a URL to generate the HTTP request including an event notification string using a URL-based format.

In a further embodiment, the event notification string includes one or more of an event type, an event value, an application session identifier, and a parameter. The event notification string includes the appropriate information identifying the event information, as well as additional information, such as parameter information and the application session identifier that identifies the notifying application. The additional information can be used to obtain additional details related to the occurrence of the event.

In another embodiment, the event notification string includes an application session identifier that corresponds to an application-state data record. The application session identifier identifies the current session of a notifying application executing on the computing system and an application-state data record that records information about the current session, including, for example, the identity of the target user.

In a further embodiment, the network interface receives an event identifier in response to the event notification string; the first executable resource provides through the network interface a query request based on the event identifier that requests a status of the notification; and the network interface receives a response indicating the status of the notification. Thus, the computer system can receive an event identifier and make a request to determine whether the notification has actually occurred.

In one embodiment, the invention is directed to a computer system configured for requesting a notification of an occurrence of an event. The computer system includes a network interface and means for producing an event notification string. The producing means is configured to detect the occurrence of the event and to generate an event notification string in response to detecting the occurrence of the event. The event notification string includes event information that identifies one or more features of the event and identification information that identifies a second executable resource capable of processing the event information on a notification server. The network interface is configured to provide the event notification string to the notification server.

In one embodiment, the invention is directed to a computer program product that includes a computer readable medium having instructions for requesting a notification of an occurrence of an event, such that the instructions, when carried out by a computer, cause the computer to perform any or all of the operations disclosed herein. For example, the instructions cause the computer to detect the occurrence of the event, to generate an event notification string in response to detecting the occurrence of the event, and to provide the event notification string to the notification server in response to generating the event notification string. The event notification string includes event information that identifies one or more features of the event and identification information that identifies an executable resource capable of processing the event information on a notification server.

In one embodiment, the invention is directed to an HTTP request suitable for use in requesting a notification of an occurrence of an event. The HTTP request includes event information that identifies one or more features of the event and identification information that identifies an executable resource capable of processing the event information on a notification server In another embodiment, the invention is directed to a computer data propagated signal embodied in a propagation medium, having a packet of data including an HTTP request suitable for use in requesting a notification of an occurrence of an event. The HTTP request includes event information that identifies one or more features of the event and identification information that identifies an executable resource capable of processing the event information on a notification server In a further embodiment, the invention is directed to a URL suitable for use in requesting a notification of an occurrence of an event. The URL includes an address of the notification server, as well as event information that identifies one or more features of the event and identification information that identifies an executable resource capable of processing the event information on a notification server.

In some embodiments, the techniques of the invention are implemented primarily by computer software. The computer program logic embodiments, which are essentially software, when executed on one or more hardware processors in one or more hardware computing systems cause the processors to perform the techniques outlined above. In other words, these embodiments of the invention are generally manufactured as a computer program stored on a disk, memory, card, or other such media that can be loaded directly into a computer, or downloaded over a network into a computer, to make the device perform according to the operations of the invention. In one embodiment, the techniques of the invention are implemented in hardware circuitry, such as an integrated circuit (IC) or application specific integrated circuit (ASIC).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to techniques for providing an event notification string over a network to a notification server. A notifying application (e.g., software application requesting a notification) monitors, or otherwise determines, the occurrence of an event of interest to a target user of a device (e.g. pager) that can receive notification of an event. For example, a user of the notifying application originates an event notification providing a voice message for the target user to receive via the target user's pager or other device. The notifying application provides an event notification string (e.g., as part of an HTTP request based on an event notification URL) that requests that the target user be notified of the occurrence of the event. The notifying application then sends the event notification string over a network, such as an IP network, to the notification server, which provides an event notification application that handles the request. The event notification string can include an event type, event value, an application session identifier, and/or other parameters, such as a parameter identifying the target user to be notified. The event notification application determines who the target user is who is to be notified, if the event notification string does not provide this information itself.

For example, if the notifying application is a voice mail application and the application user leaves a voice message for the target user, then the notifying application provides to the notification server a notification string that includes an application session identifier that identifies the current session of the notifying application with the application user. The application session identifier indicates an application-state data record in a database that describes the state of the current session of the notifying application. The notification server then uses the application session identifier to look up the application-state data record, which identifies the target user to be informed of the voice mail message. Once the event notification application knows the identity of the target user to be notified, the event notification application can then look up the preferences of the target user for notification in a user database. For instance, the target user may prefer to be notified by pager, as well as having a MWI light activated on the target user's office telephone. The notification server determines these preferences from the user database and can send an electronic mail message to the paging service for the target user, and use the public telephone networks to send out a signal activating the MWI indicator on the target user's office telephone. Thus, the notifying application can make a relatively low-overhead request to the event notification application using the event notification string for a notification without determining all of the notification details. The event notification application can determine the notification details, the devices to be notified, and make the event notification to the devices preferred by the target user without requiring any additional expenditure of resources by the notifying application.

Figure 1:
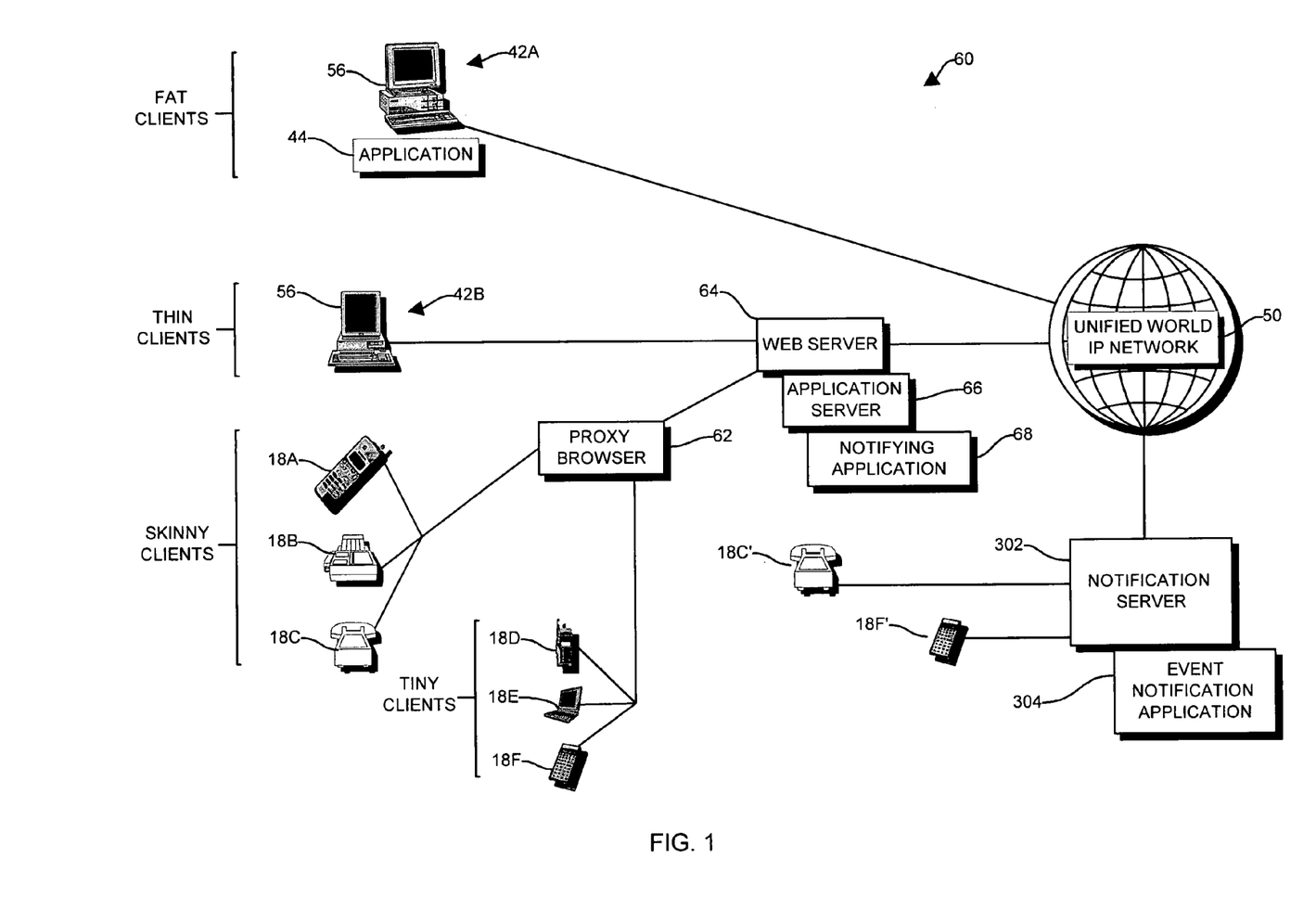
FIG. 1 is a block diagram illustrating a paradigm for providing an event notification string over an IP (Internet Protocol) network to an event notification server according to one embodiment of the present invention.

FIG. 1 is a diagram showing a sample approach for requesting an event notification over an IP network 50 according to one embodiment of the invention. FIG. 1 illustrates client computers 42 (shown individually as 42a and 42b), a unified world IP (Internet Protocol) network 50, user client devices 18 (shown individually as clients 18a, 18b, 18c, 18d, 18e, and 18f), proxy browser 62, web server 64, application server 66, application environment 68, notification server 302, and event notification application 304. The clients 18 include a cordless telephone 18a, a fax machine 18b having an attached telephone, an analog telephone 18c, a mobile phone 18d, a handheld computing device 18e, and a pager 18f (as described in more detail later).

In general, a notifying application 68 on an application server 66 determines that an event of interest to a user has occurred. For example, a user that originates the event uses the mobile phone 18d to leave a message for a target user who is to be notified of the message. In one embodiment, the originating user is an application user that access the application server 66 through a proxy browser 62. The notifying application 68 sends an event notification string (e.g. as part of an HTTP request) via the IP network 50 to the event notification application 304 on the notification server 302. The notification server 302 determines the target user to be notified and the devices that the target user wishes to use for notification. In the example shown in FIG. 1, the target user prefers that notification be given to a telephone 18c' with a MWI and to a pager 18f'. The event notification application 304 then provides the event notification to the telephone 18c' and to the pager 18f'. This process will be described in more detail in connection with the flowcharts illustrated in FIGS. 4, 6, and 7. The individual components illustrated in FIG. 1 will be discussed in more detail in the following paragraphs.

The web server 64 is preferably a server computer including a processor, a memory, and communication hardware (not specifically shown) that enables communication over a network, such as the IP network 50. The web server 64 provides a communication connection between the proxy browser 62 and the application server 66. In one embodiment, the web server 64 is a server providing communications over the World Wide Web.

The application server 66 is a server computer including a processor, a memory, and communication hardware that enables communication over a network, such as the IP network 50. The application server 66 also includes an executable resource or notifying application 68 that provides services in response to requests received over the network (e.g. HTTP requests received from the proxy browser 62). The notifying application 68 can provide a notifying function by making requests for notification (e.g. via HTTP requests) over the IP network 50 to the event notification application 304 on the notification server 302.

The notification server 302 is a server computer including a processor, a memory, and communication hardware (not specifically shown) that enables communication over a network, such as the IP network 50. The notification server 302 includes an executable resource or event notification application 304 that provides notification services in response to requests received over the network (e.g. HTTP requests). Each executable resource, such as 68 or 304, includes one or more programs, scripts, procedures, routines, objects, and/or other software entities, capable of executing on a computing device.

The proxy browser 62 is a computing device including a processor, a memory, and communication hardware that enables communication over the IP network 50. The proxy browser 62 provides browser services over the World Wide Web for clients that have limited capabilities and which do not typically include their own web browsers. The proxy browser 62 is capable of making requests (e.g. HTTP requests) over the network 50 to the application server 66. In one embodiment, the proxy browser 62 is capable of making notification requests (e.g. HTTP requests) over the network 50 directly to the notification server 302 without having the notification requests pass through or be initiated by the application server 66 and notifying application 68.

The fat client 42a is a computer system including a processor, a memory, an output device, such as a visual display, an input device for the customer to provide input, and communication hardware that enable communication over a network, such as the IP network 50. The fat client 42a includes a web browser 56 and a local application 44 running on the fat client 42a and providing services to the fat client 42a. The fat client 42a is capable of initiating a notification request to the notification server 302, as well as being capable of receiving a notification, such as an electronic mail or other notification message, for the user of the fat client 42a from the notification server 302.

The thin client 42b is a computer system including a web browser 56. The thin client 42b typically has less capacity than the fat client 42a and does not typically initiate a notification request to the notification server 302. The thin client 42*b* is capable of receiving a notification, such as an electronic mail or other notification message, for a user of the thin client 42*b* from the notification server 302.

The user client devices 18*a*, 18*b*, and 18*c*, illustrated as a cordless telephone 18*a*, a fax machine 18*b* having an attached telephone, and an analog telephone 18*c*, are referred to herein as "skinny clients," defined as devices that are able to interface with a user to provide voice and/or data services (e.g., via a modem) but cannot perform any direct control of the associated access subnetwork. The wireless user client devices 18*d*, 18*e*, and 18*f*, illustrated as a mobile or cellular telephone 18*d*, a handheld computing device (e.g., a 3-Com Palm Computer or Windows CE-based handheld device) 18*e*, and a pager 18*f*, are referred to as tiny clients. "Tiny clients" tend to have even less functionality than skinny clients in providing input and output interaction with a user. The clients 18 do not typically initiate notification requests directly to the notification server 302, but would initiate such requests through the proxy browser 62 and the application server 66. However, in one embodiment, the clients 18 can also receive event notifications in a direct mode (i.e., directly from the notification server 302, such as through the public telephone network). For example, the clients 18 receive an event notification from the notification server 302, as shown for clients 18*c*' and 18*f*' in FIG. 1. In another embodiment, the clients 18 can also receive event notifications in an indirect mode, that is, from the notification server 302 via the IP network 50 and the proxy browser 62.

Figure 2:
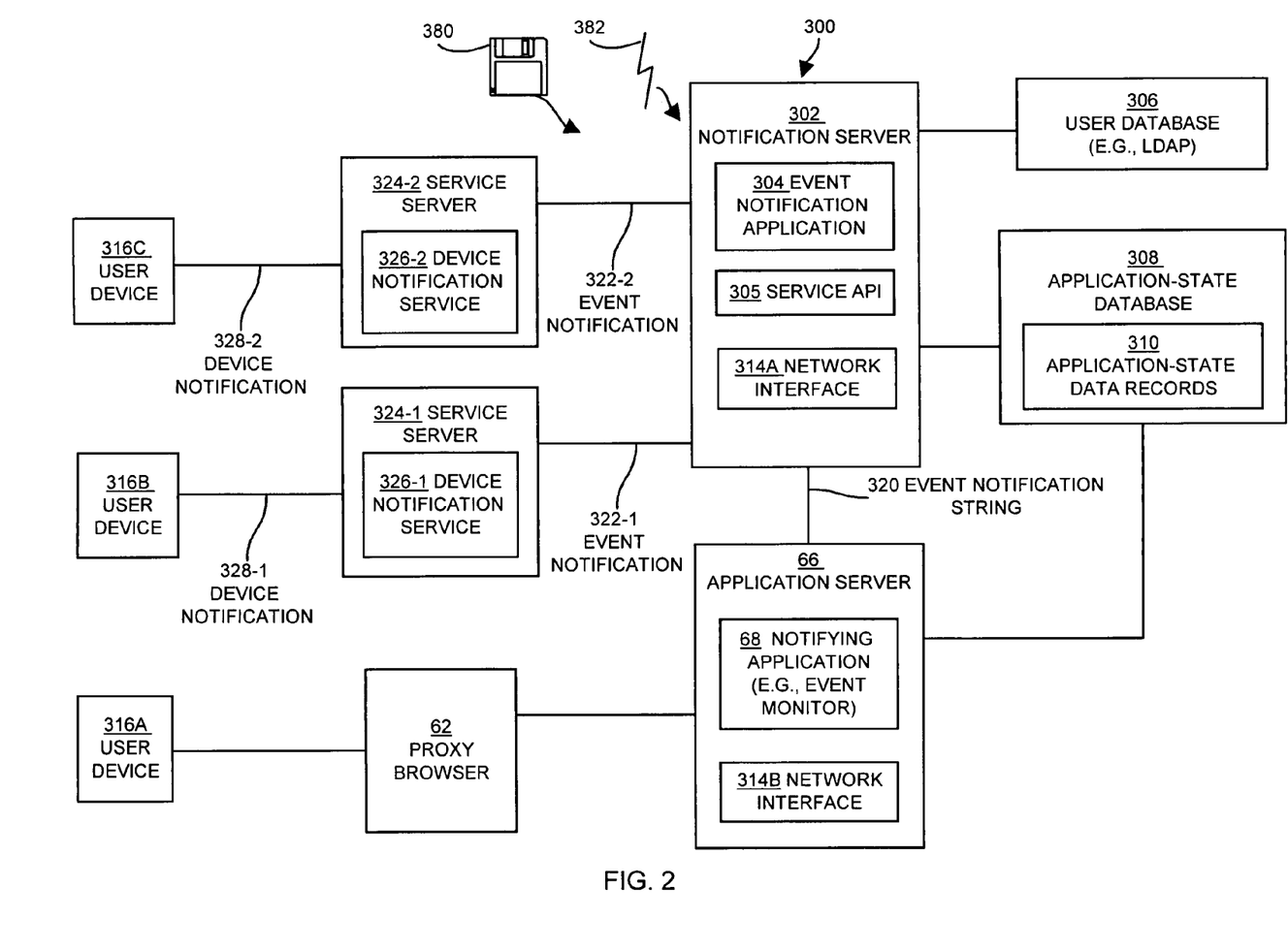
FIG. 2 is a block diagram illustrating an application server, notification server, service servers, user database, application-state database, proxy browser, and user devices according to one embodiment of the invention.

FIG. 2 shows a block diagram illustrating, in addition to what is shown in FIG. 1, service API (application programming interface) 305, user database 306, application-state database 308, application-state data records 310, network interfaces 314*a*, 314*b*, user devices 316*a*, 316*b*, 316*c*, and service servers 324-1, 324-2, computer program product 380, and computer program propagated signal product 382 according to one embodiment of the invention.

The service API 305 is one or more programming interfaces available on the notification server 302 that the event notification application 304 uses to communicate with services providing access to external resources, such as electronic mail or databases on the Internet. The service API 305 is, for example, an interface to electronic mail based on SMTP (Simple Mail Transfer Protocol), to messaging services based on IMAP (Internet Message Access Protocol), to a directory over a network based on LDAP (Lightweight Directory Access Protocol) or to other resources or services. In another example, the service API 305 is an interface to telephony services or protocols that allow the notification server 304 to communicate with telephony devices 316 over the PSTN (public switched telephone network). In one embodiment, the service API 305 provides an interface to device notification services 326-1, 326-2 available on service servers 324-1, 324-2 (described in more detail later).

The user database 306 is a database, such as a database provided on a computer over a network or other suitable connection allowing communication with the notification server 302. The user database 306 includes profile information for users of the client devices 316 who wish to be notified of events. In one embodiment, the users are subscribers to services, such as a voice messaging service or a paging service. In another embodiment, the users are subscribers to an event notification service provided by the event notification application 304. In one embodiment, the users provide profile information and notification preferences over the Internet to the user database 306. In one embodiment, the notification server 302 accesses the user database 306 over the Internet through the network interface 314*a*. In other embodiments, the notification server 302 accesses the user database 306 through a network connection other than the Internet, or the user database 306 is part of the notification server 302. In a further embodiment, the user database 306 is an LDAP directory including user information or subscriber profile information. The notification server 302 accesses the user database 306 to determine user preferences for notification. For example, the user can indicate what devices 316 he or she wishes to be notified upon the occurrence of an event.

The application-state database 308 is a database that includes application-state data records 310 that specify the application state for an instance of an application. For example, an application-state data record or "brownie" 310 can specify the application state for an instance of the notifying application 68. In one embodiment, the application-state data record 310 includes a session identifier (e.g., "sesid") that identifies a unique application session for an instance of the notifying application 68. The application server 66 generates the unique session identifier for each application-state data record 310. For example, the user of client device 316*a* establishes an interactive application session, such as a voice mail or messaging session, with the notifying application 68 through the proxy browser 62. The notifying application 68 uses the application-state data record 310 to maintain a current state of the application session. In one embodiment, the application-state data record 310 also includes additional information related to event notification, such as the identity of a target user that the application user wishes to notify, for example, to notify the target user of a message provided by the application user. In one embodiment, the application-state data record 310 is implemented according to commonly assigned, copending U.S. patent application Ser. No. 09/461,191, which is described in more detail later.

The network interface 314*a*, 314*b* (referred to generally as network interface 314) is an interface that provides communication through a network, such as the Internet, between the notification server 302 and the application server 66. In one embodiment, the network interface 314 is a hardware interface, such as network interface card, along with associated supporting software. The network interface 314*a*, in one embodiment, also provides a communication connection from the notification server 302 to the user database 306 and the application-state database 308. In another embodiment, the network interface 314*b* provides a communication connection from the application server 66 to the application-state database 308. The application server 66 sends an event notification string 320 through the network interface 314*b* to the notification server 302.

The user devices 316*a*, 316*b*, and 316*c* (referred to generally as user device 316) are client devices, such as a client device 18, client computer 42, or other client device or computer, such as an IP telephone communicating through a computer over an IP network 50.

Each service server 324-1 or 324-2 (referred to generally as service server 324) is a server computer including a processor, a memory, and communication hardware (not specifically shown) that enables communication over a network, such as the IP network 50. The service servers 324-1, 324-2 include device notification services 326-1, 326-2 (referred to generally as device notification service 326) that provides notification to one of the user devices 316, as described below. The device notification service 326 includes one or more programs, scripts, procedures, routines, objects, and/or other software entities, capable of executing on a computing device. For example, the device notification service 326 is a SMS (Short Message Service), SMTP mailing service, a paging service (using a paging protocol) and/or other service capable of providing a notification to a user device 316.

An application user communicates with the application server 66 by using the user device 316a and generates an event (e.g., a request to page the target user). The application server 66 sends an event notification string 320 to the notification server 302. The notification server 302 sends an event notification 322-1, 322-2 (referred to generally as event notification 322) by interfacing with the device notification services 326 such as SMS, SMTP, a paging service (using a paging protocol), and other services by using the respective service API's 305. The device notification service 326 provides a device notification 328-1, 328-2 (referred to generally as device notification 328) based on the event notification 322. The device notification service 326 sends the device notification 328 to the target user at one of the user devices 316 used by the target user. For example, the event notification application 304 uses a paging service API 305 to send an event notification 322 to a paging notification service 326, which in turn sends a device notification 328 (e.g. phone number for the target user to call) based on the event notification 322 to the target user's device (e.g. pager) 316.

In one embodiment, a computer program product 380 including a computer readable medium (e.g. one or more CDROM's, diskettes, tapes, etc.) provides software instructions for the notifying application 68, event notification application 304, proxy browser 62, and/or other devices shown in FIG. 1. The computer program product 380 can be installed by any suitable software installation procedure, as is well known in the art. In another embodiment, the software instructions can also be downloaded over a wireless connection. A computer program propagated signal product 382 embodied as a propagated signal on a propagation medium (e.g. a radio wave, an infrared wave, a laser wave, sound wave, or an electrical wave propagated over the Internet or other network) provides software instructions for the notifying application 68, event notification application 304, proxy browser 62, and/or other device shown in FIG. 1. In alternate embodiments, the propagated signal is an analog carrier wave or a digital signal carried on the propagation medium. For example, the propagated signal can be a digitized signal propagated over the Internet or other network. In one embodiment, the propagated signal is a signal that is transmitted over the propagation medium over a period of time, such as the instructions for a software application sent in packets over a network over a period of seconds, minutes, or longer. In another embodiment, the computer readable medium of the computer program product 380 is a propagation medium that the computer can receive and read, such as by receiving the propagation medium and identifying a propagated signal embodied in the propagation medium, as described above for the computer program propagated signal product 382.

Figure 3:
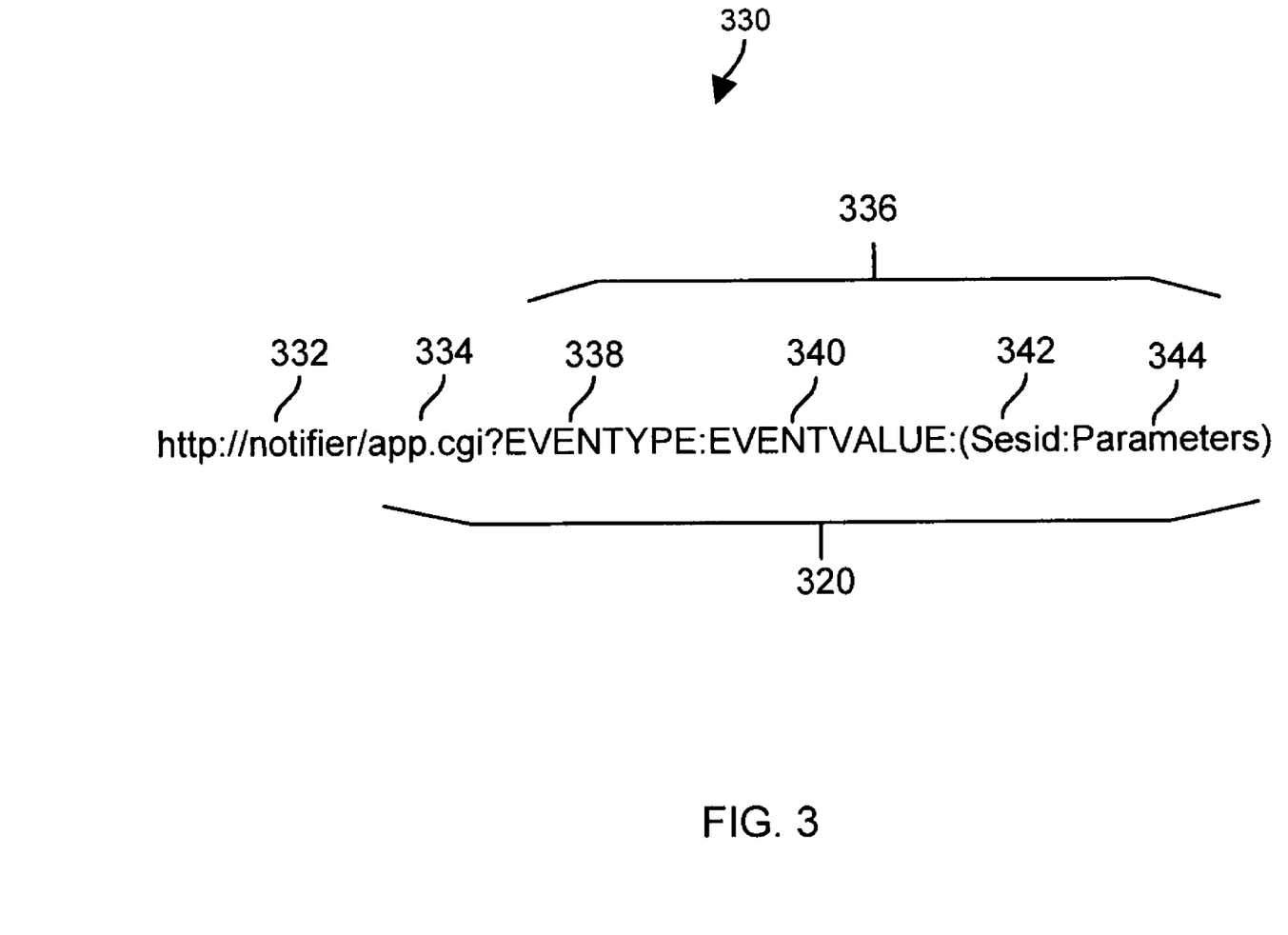
FIG. 3 is a diagram illustrating an event notification URL including an event notification string according to one embodiment of the invention.

FIG. 3 illustrates an event notification URL 330 including an event notification string 320, for one embodiment of the invention. The event notification URL 330 includes a notifier field 332 and event notification string 320. The event notification string 320 includes an application field 334 and event information 336. The event information 336 includes event fields 338, 340, session identification (ID) field 342, and parameter field 344.

The notifier field 332 indicates the identity of a notification server 302 that is capable of handling the event notification string 320. The application field 334 indicates the identity of an executable resource or software application available on the notifier, such as event notification application 304, that is capable of processing the event information 336. In the example shown in FIG. 3, the event notification application 304 is a CGI (Common Gateway Interface) script that executes on the notification server 302. The event fields 338, 340 include the event type field 338 that provides information on the event type and the event value field 340 that provides an event value associated with the event type field 338. The session ID field 342 includes an application session identifier for an application session (e.g. session of the notifying application 68) that enables identification of an application-state record 310 recording the current status of that application session. The parameter field 344 provides information on additional parameters, such as information on a user device 316, or an identification of a target user.

In one embodiment, the event notification string 320 includes the application field 334, and one or more of the event type field 338, event value field 340, session ID field 342, and the parameter field 344. In another embodiment, the event notification string 320 is based on the URL 330 and is included in an HTTP request (e.g. GET request) that the application server 66 transmits to the notification server 302. In a further embodiment, the application server 66 transmits the URL 330 to another computer or server, such as in an HTML page that lists the URL 330 in the page. For example, the application server 66 transmits the URL 330 to the proxy browser 62, which in turn submits the event notification string 320 (e.g., as part of an HTTP request) to the notification server 302.

The event fields 338, 340 may include, in one embodiment, certain event types and values that are typically used with a session ID 342 or a parameter 344 to identify a target user, as shown in the following examples:

MSGWAITING:ON—indicates that a message indicator or other mechanism be activated to indicate that the target user has a message. The indication mechanism can be any commonly used mechanism, software indicator, or feature of a device 316 commonly used to indicate that a message is waiting. For example, the message indicator can be a message box displayed on the display of a target user's computer. The message indicator can also be a message light, a beeper, or a vibration (e.g., for a pager).

MSGWAITING:OFF—indicates that a message event indicator or other mechanism be inactivated to indicate that the message has been received and/or deleted.

MAILQUOTA:FULL—indicates that the target user's mail box is full and cannot receive any other messages.

URGENT_MSGWAITING:ON—indicates the message is urgent and that the message indicator be activated in an urgent mode.

URGENT_MSGWAITING:OFF—indicates the urgent message indicator be inactivated.

The event fields 338, 340 include the following event types and values that do not typically require a session ID 342 or a parameter 344 to identify a target user:

MSGWAITING:PURGE—indicates to purge all waiting messages.

EVENTQUEUE:PURGE—indicate to purge all event notifications (e.g. in a queue maintained by the notification server 302).

The event type field 338 and value field 340 are not limited to the event types and values listed herein. In other embodiments, the event fields 338, 340 list other types of event types and values suitable for use in requesting an event notification.

Figure 4:
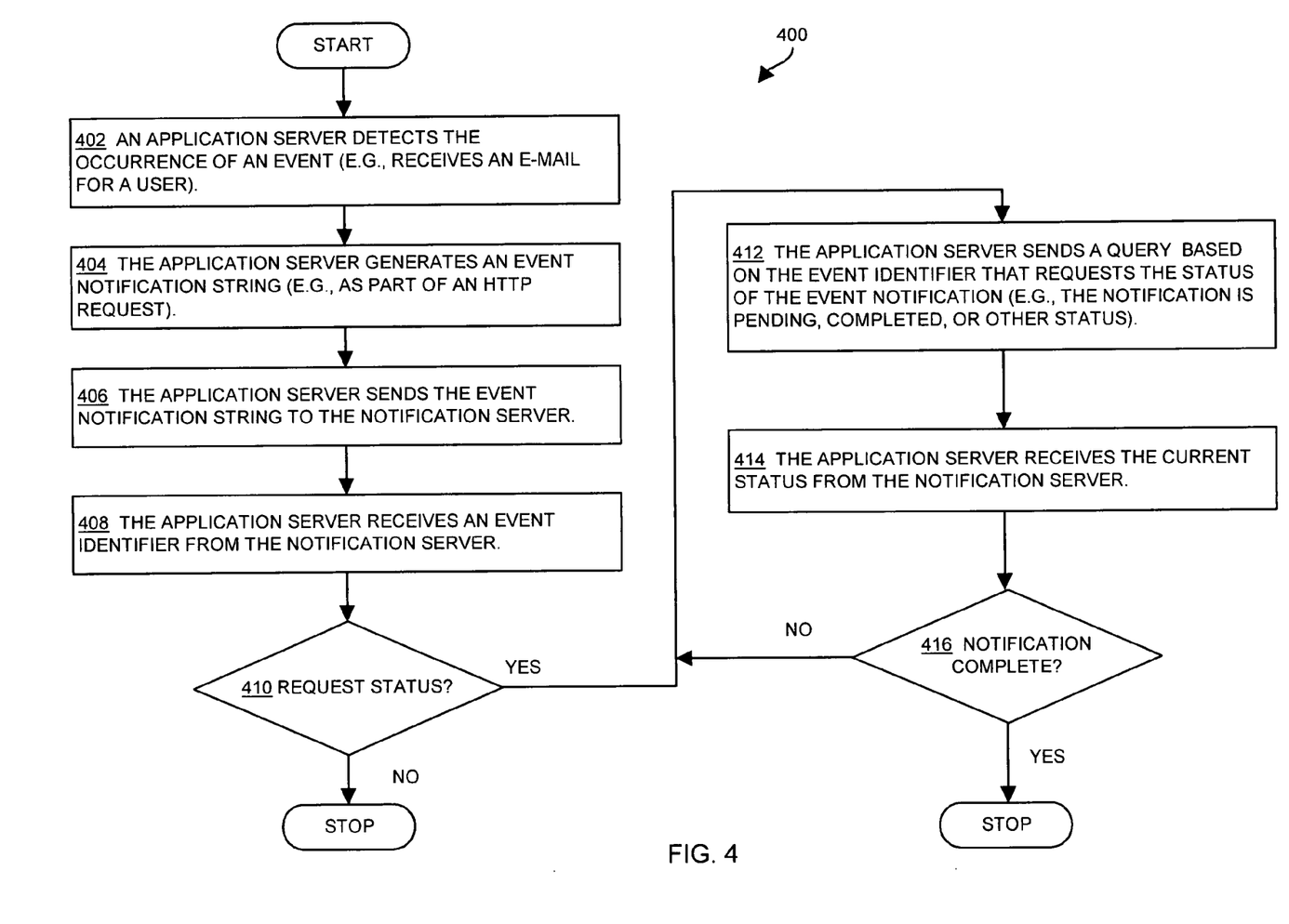
FIG. 4 is a flow chart of the process of an application server generating an event notification string and subsequently requesting the status of the event notification for one embodiment of the invention.

FIG. 4 is a flow chart of the process 400 of generating an event notification string 320, sending it to the notification server 302, and subsequently requesting the status of the event notification for one embodiment of the invention.

In step 402, an application server 66 detects the occurrence of an event, for example by using a notifying application 68. For example, an electronic mail handling application detects the arrival of a piece of electronic mail for a target user, who is a user of the electronic mail service. The electronic mail may be of a particular type or from a particular user, such as electronic mail from the user's supervisor. In this example, the supervisor is an application user of a user device 316*a* in communication with the electronic mail or notifying application 68.

In another example, an application user accesses a notifying application 68 (e.g., voice mail application) through a user device 316*a* to leave a voice mail message for a target user. The target user is also a user of the notifying application 68 and/or has provided user profile information to the user database 306. In this example, the notifying application 68 treats the arrival of the voice mail message at the application 68 as an occurrence of an event of significance to the target user.

In step 404, the application server 66 generates an event notification string 320 (e.g., as part of an HTTP request). The event notification string 320 includes an application field 334 and event information fields 336 (as described above for FIG. 3).

In step 406, the application server 66 sends the event notification string 320 to the notification server 302. In one embodiment, the application server 66 makes an HTTP request, including the event notification string 320, to the notification server 302.

In step 408, the application server 66 receives an event identifier from the notification server 302 that identifies the event notification. The application server 66 can use the event identifier to request from the notification server 302 the current status of the event notification.

In step 410, the application server 66 determines whether or not to request the current status of the event notification. For example, the application user has requested that he/she receive feedback on whether the target user actually receives the notification about a message that the application user has left for the target user.

In step 412, the application server 66 sends a query based on the event identifier to the notification server 302. The query requests the status of the event notification 322 to the client devices 316 identified for the target user. For example, the application server 66 can determine whether the notification 322 is pending, complete, or has some other status.

In step 414, the application server 66 receives the current status from the notification server 302 (as shown, for example, in FIG. 5, to be discussed later).

In step 416, the application server 66 determines from the current status if the notification is complete. If the status is not complete, the application server 66 optionally determines to repeat the query (returning to step 412).

Figure 5:
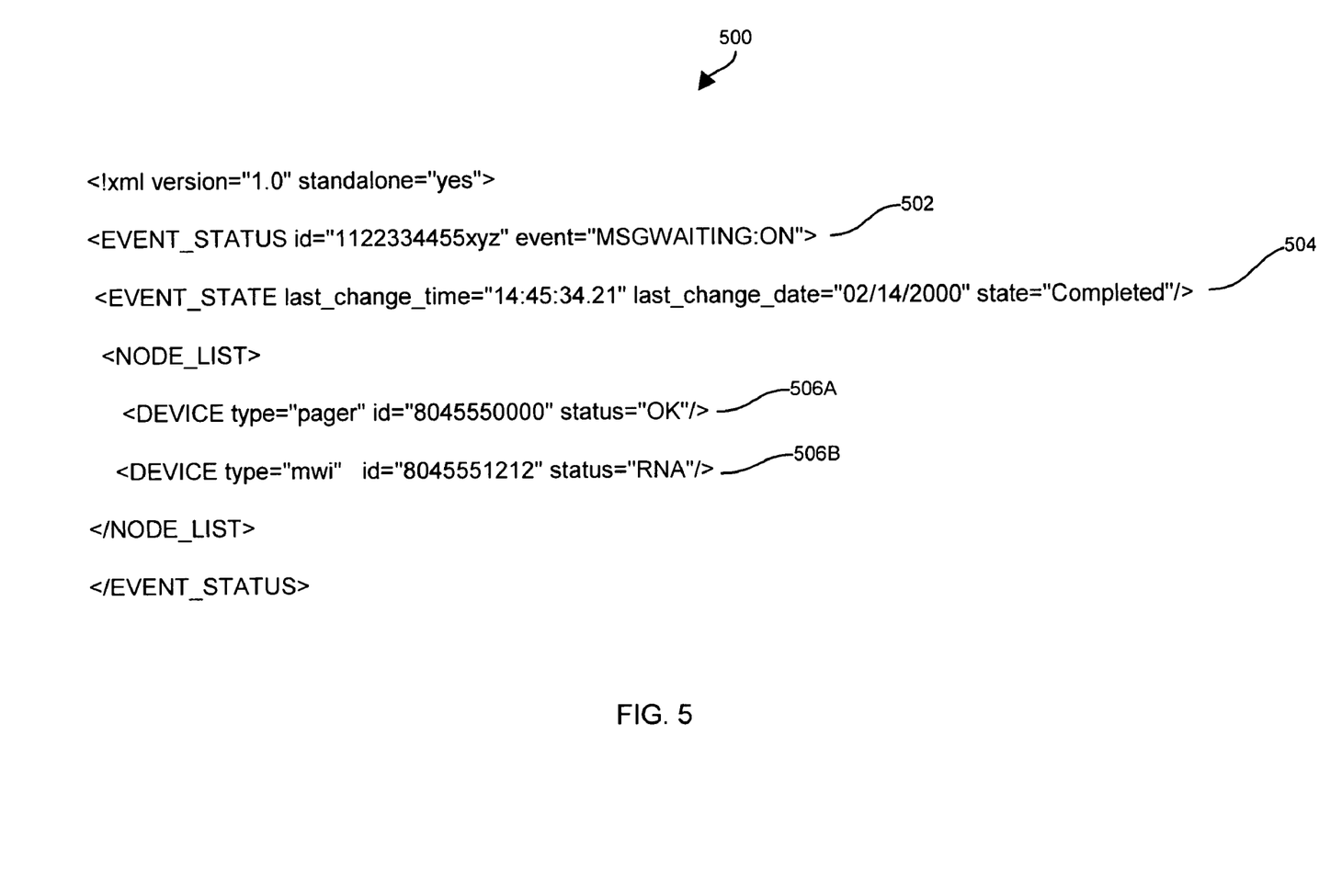
FIG. 5 is a diagram illustrating a sample status page returned in response to a request for the current status of an event notification.

FIG. 5 is a diagram illustrating a sample status page 500 returned in response to a request for the current status of an event notification 322. The status page 500 includes an event status header 502, an event state 504, and one or more device reports 506*a*, 506*b* (referred to generally as device report 506).

The event status header 502 provides the event identifier (e.g., "1122334455xyz") and the event type and value (e.g., "MSGWAITING:ON"). The event state 504 indicates that the event indicated by the event identifier was successfully processed, in this example, at "14:45" (2:45 PM). The device report 506*a* indicates, in this example, that the target user's pager at telephone number 804-555-0000 was successfully paged. The device report 506*b* indicates, in this example, that the message light on the target user's telephone number 804-555-1212 was not changed. The "RNA" in the second device report 506*b* indicates that the resource (e.g., telephone) was not available.

Figure 6:
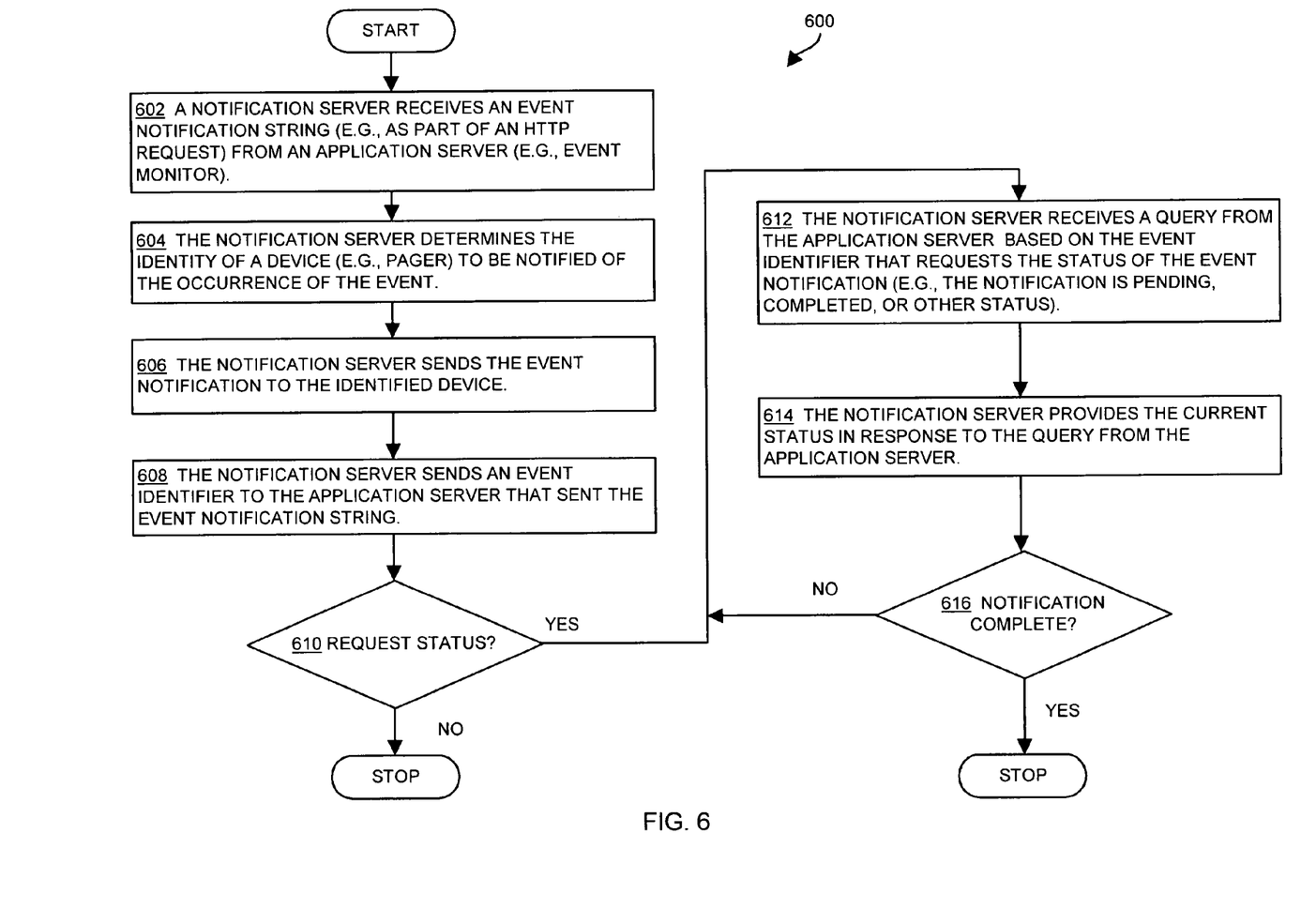
FIG. 6 is a flow chart of the process of an notification server receiving an event notification string and subsequently providing the status of the event notification for one embodiment of the invention.

FIG. 6 is a flow chart of the process of a notification server 302 receiving an event notification string 320 and subsequently providing the status of the event notification, for one embodiment of the invention. Generally, the event notification application 304 performs the operations in steps 602–616.

In step 602, the notification server 302 receives the event notification string 320 (e.g. as part of an HTTP request) from the notifying application 68 on the application server 66.

In step 604, the notification server 302 determines the identity of a device 316 (e.g. pager) used by the target user to receive the notification of the occurrence of the event. If the event notification string 320 includes an application session identifier 342, the notification server 302 determines the identity of the device 316 by using the session identifier to access one of the application-state data records 310 from the application state database 308. In one embodiment, the application-state data records 310 includes information on the identified session of the notifying application 68, including information on the target user. For example, the application user who is using the identified session of the notifying application 68 indicates that he/she wishes to leave a voice mail message for the target user. Alternatively, the event notification string 320 includes a parameter 344 that identifies the target user, and the notification server 302 uses the parameter 344 to identify the target user. In one embodiment, after the event notification server 302 identifies the target user, then the notification server 302 looks up user profile information in the user database 306 to identify one or more user devices 316 that the target user has indicated that he/she wants to receive messages on.

In step 606, the notification server 302 sends the event notification 322 via the service API 305 and device notification service 326 to the user device 316 identified for the target user. For example, as shown in FIG. 2 the notification server 302 sends one event notification 322-1 to the device notification service 326-1, which sends a device notification 328-1 to user device 316*b*, and another event notification 322-2 to the device notification service 326-2, which sends a device notification 328-2 to user device 316*c*.

In step 608, the notification server 302 sends an event identifier to the application server 66 that had sent the event notification string 320. In one embodiment, the application server 66 sends the event notification string 320 as part of an HTTP request, and the response from the notification server 302 includes the event identifier.

In step 610, the application server 66 determines whether or not to request the current status of the event notification from the notification server 302.

In step 612, the notification server 302 receives a query from the application server 66 based on the event identifier that requests the status of the event notification (e.g., whether the notification is pending, completed, or has another status).

In step 614, the notification server 302 provides the current status (see, for example, FIG. 5) in response to the query from the application server 66.

In step 616, the application server 66 determines from the current status if the notification is complete. If the status is not complete, the application server 66 optionally determines to repeat the query (returning to step 612).

Figure 7:
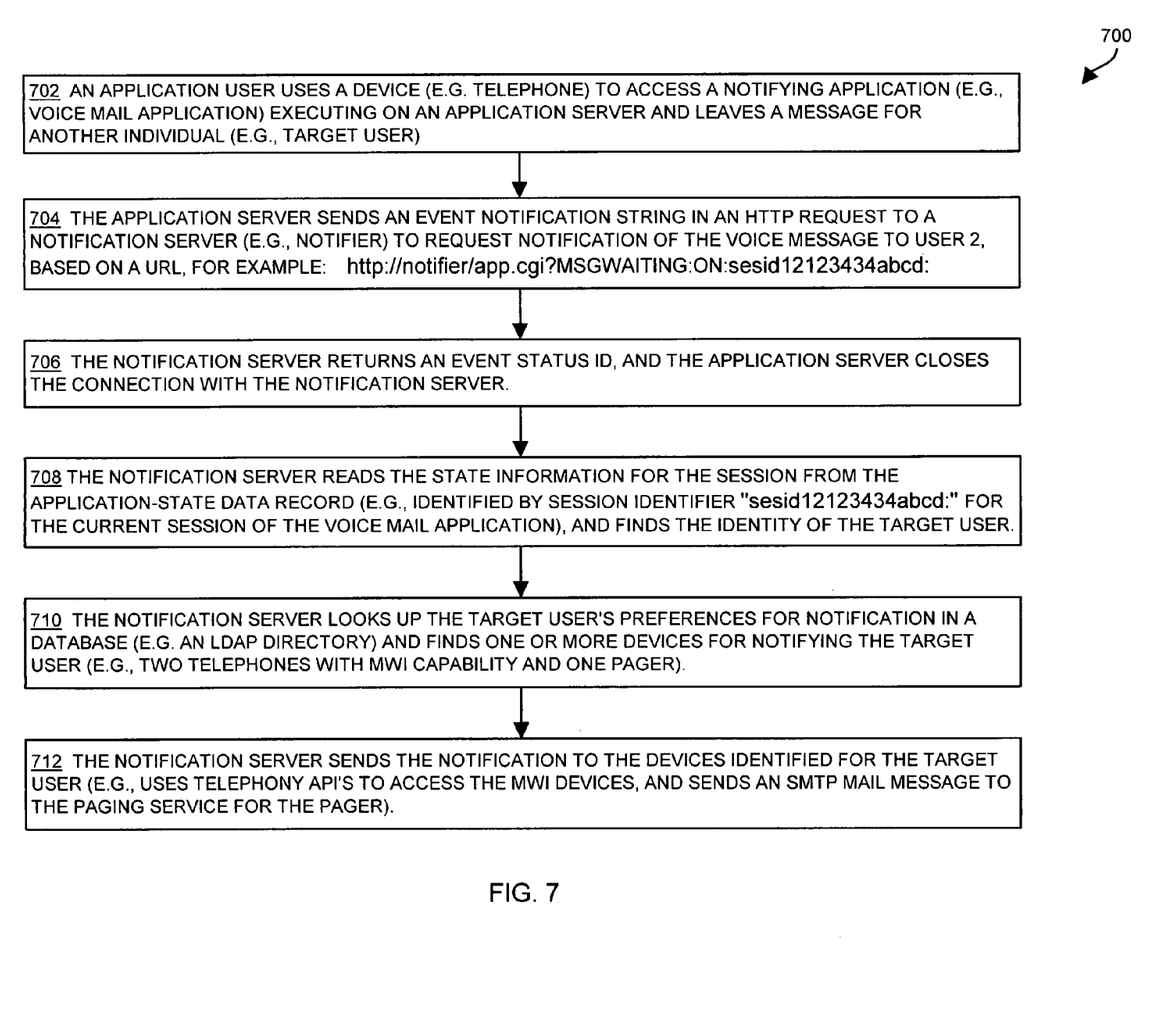
FIG. 7 is a flow chart of the process of providing an event notification based on a user's preferences for notification according to one embodiment of the invention.

FIG. 7 is a flow chart of the process 700 of providing an event notification 322 based on a user's preferences for notification according to one embodiment of the invention.

In step 702, the user of a notifying application 68 (e.g. a voice mail application) uses a device 316 (e.g., telephone) to access the notifying application 68 and leave a message for another individual or target user who is to receive the message. The notifying applications 68 stores in the application-state database 308 an application-state data record 310 indicating the state of the current session of the notifying application 68 that is interacting with the application user. The data record 310 provides information about the session, which is identified with a session ID, including, for example, the identification of the target user to receive the message.

In step 704, the application server 66 opens a connection to the notification server 302 (e.g., an Internet connection). The application server 66 then sends an event notification string 320 in an HTTP request to a notification server 302 (e.g., notifier) to request notification of the voice message to the target user, based on an event notification URL 330. The event notification URL 330 shown as an example in step 704 includes a notifier (e.g., "app.cgi"), an event type (e.g., "MSGWAITING"), an event value (e.g., "ON"), and session ID (e.g., "sesid12123434abcd"). See the discussion for FIG. 3 for more details on the format of the event notification URL 330.

In step 706, the notification server 302 returns an event status identification to the application server 66 in response to the HTTP request sent in step 704. The application server 66 then closes the connection with the notification server 302.

In step 708, the notification server 302 accesses the application-state database 308 and reads the application state information for the session of the notifying application 68 from the application-state data record 310. In this example, the application-state data record 310 is identified by the session identifier (e.g., "sesid12123434abcd") received in step 704 in the event notification string 320 by the notification server 302 from the application server 66. The notification server 302 determines the target user to be notified from the application-state data record 310.

In step 710, the notification server 302 looks up the target user's preferences for notification in a user database 306 (e.g., an LDAP directory) and finds one or more devices 316 for notifying the target user (e.g. two telephones with MWI capability and one pager). The target user, at a previous point in time, has indicated to the user database 306 what his/her notification preferences are, such as when the target user subscribed to the voice mail system.

In step 712, the notification server 302 sends the notification via a service API 305 and device notification service 326 to the devices 316 indicated by the target user. For example, the notification server 302 uses telephony service API's 305 to access the MWI devices (e.g. telephones) and uses an SMTP service API 305 to send an SMTP mail message to the paging service for the pager. In other examples, the notification server 302 sends the event notification 322 by interfacing with device notification services 326 such as SMS, SMTP, a paging service (using a paging protocol), and/or other services by using respective service API's 305.

In one embodiment, the application-state data record 310 is implemented according to commonly assigned, copending patent application Ser. No. 09/461,191, filed Dec. 15, 1999, entitled "Apparatus and Method for Providing Server State and Attribute Management for Voice Enabled Web Applications" the disclosure of which is incorporated in its entirety herein by reference, which discloses an arrangement for providing the application server state and managing application attributes for a notifying application 68. For example, the notifying application 68 may be a voice mail application accessed by an application user who provides a message (i.e., occurrence of an event) for a target user. An application server 66 configured for executing voice-enabled web applications for a web browser generates and maintains a server-side data record 310 that includes application state information and user attribute information for an identified user session with a web browser. The application server 66, in response to receiving a new web page request from a browser (e.g., proxy browser 62), upon verifying that a new session with the user is required, creates a transient application session and executes a web application instance of the notifying application 68 to complete the request, and generates the server-side data record 310 including application state information for the application session and user attribute information for the user of the application session. The server-side data record also includes a session identifier that uniquely identifies the session with the user of the application session. The application server 66 stores the server-side data record 310 in a memory resident, such as the application-state database 308, within the server side of the network, and sends to the browser the session identifier and the corresponding web page requested by the web browser. In response to receiving a second web page request from the browser that includes the session identifier, the application server 66 executes a new web application instance of the notifying application 68, and recovers the server-side data record 310 from the memory based on the session identifier included in the second page request. Hence, the application server 66 is able to resume processing relative to the prior application state and user attributes specified in the server-side data record 310, providing a state-full session for the user without the passing of the application state and the user attributes to the browser as cookies.

Thus, the application-state data record 310 is available to a notification server 302 from the application-state database 308. The event notification application 304 within the notification server 302 accesses the application-state data record 310 in response to receiving the event notification string 320 to obtain information about an event, such as the identity of a target user who is to receive a voice mail message.

While this invention has been particularly shown and described with references to preferred embodiments thereof, it will be understood by those skilled in the art that various changes in form and details may be made therein without departing from the spirit and scope of the invention as defined by the appended claims.

For example, the user database 306 and the application-state database 308 can be databases provided on separate computers from the notification server 302 or application server 66. Alternatively, a server can include one or more of the databases. For example, the notification server 302 can include the user database 306.

In addition, the components shown in FIG. 2 may be combined within one or more computing devices. For example, the user device 316*a* can be an IP telephone connected directly to the desktop computer that also serves as the application server 66.

Furthermore, the notifying application 66 can send the event notification string 320 to the event notification application 304 by communication protocols other than HTTP. The notifying application 66 can use any communication protocol suitable for communicating a string of information between two devices. Suitable protocols can provide for communication over a network, through telephone lines, by a direct connection between two computers, or by other transmission via radio, light, sound, electrical transmission, or other approaches.

What is claimed is:

1. A method in a notification server for providing a notification of an occurrence of an event, the method comprising the steps of:
   receiving an event notification string comprising event information that identifies at least one feature of the event, identification information that identifies an executable resource capable of processing the event information and at least one of an event type, an event value, parameter, and an application session identifier;
   determining notification information that identifies a device to be notified of the occurrence of the event by accessing an application-state data record based on the application session identifier in response to receiving the event notification string;
   providing an event notification to the device in response to determining the notification information;
   providing an event identifier in response to receiving the event notification string and determining the notification information;
   receiving a query request based on the event identifier that requests a status of the event notification; and
   providing a response to the query request that indicates the status of the event notification.

2. The method of claim 1, wherein the step of receiving the event notification string comprises receiving a hypertext transport protocol (HTTP) request comprising the event information and the identification information.

3. The method of claim 1, wherein the step of determining the notification information comprises accessing a database comprising notification preferences of a user.

4. The method of claim 3, wherein the step of accessing a database comprises accessing an application-state registry.

5. The method of claim 3, wherein the step of accessing a database comprises accessing user profile information from a lightweight directory access protocol (LDAP) directory.

6. The method of claim 3, wherein the step of providing the event notification comprises notifying the device according to the notification preferences.

7. The method of claim 3, wherein the step of providing the event notification comprises notifying at least one preferred device identified by the notification preferences.

8. The method of claim 1, wherein the step of providing an event notification to the device comprises providing the event notification based on an application programming interface (API) to a service that provides communication to an external resource.

9. A notification server configured for providing a notification of an occurrence of an event, the notification server comprising:
   a network interface; and
   an executable resource, wherein:
   the network interface is configured to receive an event notification string comprising event information that identifies at least one feature of the event, identification information that identifies an executable resource capable of processing the event information, and at least one of an event type, an event value, an application session identifier, and a parameter;
   the executable resource is configured to determine notification information that identifies a device to be notified of the occurrence of the event based on the event notification string and to provide through the network interface an event notification to the device based on the notification information, and wherein the executable resource accesses an application-state data record based on the application session identifier;
   the network interface provides an event identifier generated by the executable resource based on the event notification string and the notification information;
   the network interface receives a query request based on the event identifier that requests a status of the event notification; and
   the executable resource provides through the network interface a response to the query request that indicates the status of the event notification.

10. The notification server of claim 9, wherein the event notification string is a hypertext transport protocol (HTTP) request comprising the event information and the identification information.

11. The notification server of claim 9, wherein the executable resource accesses a database comprising notification preferences of a user.

12. The notification server of claim 11, wherein the database is application-state registry.

13. The notification server of claim 11, wherein the database is a lightweight directory access protocol (LDAP) directory and the executable resource accesses user profile information from the LDAP directory.

14. The notification server of claim 11, wherein the network interface notifies the device according to the notification preferences.

15. The notification server of claim 11, wherein the network interface notifies at least one preferred device identified by the notification preferences.

16. The notification server of claim 9, wherein the executable resource provides the event notification based on an application programming interface (API) to a service that provides communication to an external resource.

* * * * *